United States Patent Office 3,086,050
Patented Apr. 16, 1963

3,086,050
PROCESS AND MEANS FOR EXTRACTING ORGANIC SOLVENTS FROM BATHS CONTAINING THEM
Luigi Notarbartolo, Milan, and Alberto Pasin, Cesano Maderno, Italy, assignors to Snia Viscosa Società Nazionale Industria Applicazioni Viscosa S.p.A., Milan, Italy, a company of Italy
No Drawing. Filed July 10, 1961, Ser. No. 122,610
Claims priority, application Italy July 19, 1960
1 Claim. (Cl. 260—561)

It is an object of the present invention to provide the recovery of volatile organic solvents miscible with water from coagulating and stretching baths as particularly used for the spinning of acrylonitrile polymers. By "acrylonitrile polymers" are intended polyacrylonitrile as well as the copolymers, the interpolymers, the graft polymers and the mixtures of polymers of acrylonitrile. In particular, the most commonly used volatile organic solvent for preparing solutions of such polymers, and to which the invention more particularly refers, is dimethylformamide.

The coagulating and stretching baths for the wet-spinning of polyacrylonitrile polymers, are often constituted essentially by aqueous solutions of salts containing more or less elevated percentages of the volatile organic solvent employed to prepare the solution of the polymer. Said solvent is accumulating in the coagulating and stretching baths and, therefore, the spinning conditions vary, whence it has to be recovered from said baths, be it to keep the spinning conditions constant, be it for obvious economic reasons. Since the recovering treatment is the same, be it a coagulating bath or be it a stretching bath that is involved, reference will be made hereinafter exclusively to coagulating baths, it being implicit that what is said for them is applicable also to stretching baths as well as to baths employed in the spinning of polymers distinct from acrylonitrile polymers.

In particular, the baths to which the present invention refers are those described in a co-pending application of the same applicant, namely baths essentially constituted by solutions of potassium formate, preferably in percentages between 30 and 75% by weight of said formate, containing the organic solvent to be recovered.

The invention is characterized in that the dimethylformamide is recovered from the baths by extraction with an ester selected from the methylic, ethylic, n-propylic and isopropylic esters of formic acid and the methylic, ethylic, n-propylic and amylic esters of acetic acid. These esters can be employed alone or mixed with one another or in admixture with other extracting means, such as for instance methylene chloride.

As is known, the effectiveness of the extracting process depends on the coefficient of distribution of the organic solvent, in particular of dimethylformamide, in the extracting means employed and in the solution from which it has to be extracted. Said coefficient is defined as the ratio between the percentage by weight of the dimethylformamide contained after the extraction in the extracting liquid and the percentage by weight of the dimethylformamide that has remained in the extracted bath:

$$K = \frac{\text{Percent of DMF in the extracting medium}}{\text{Percent of DMF in the extracted bath}}$$

The coefficient of distribution of dimethylformamide in the esters listed above and in the solutions of potassium formate varies from 2 to 6.

Among the esters cited above, are preferred those having low boiling point and scarce solubility in water, since it is easier to separate therefrom by distillation the anhydrous dimethylformamide. In particular are preferred the formates of ethyl and of iso-propyl, ethyl acetate and the mixtures of methyl chloride and ethyl formate, which all give high extraction yield and short separating times and which can be easily separated by distillation from dimethylformamide.

In addition to dimethylformamide, other volatile organic solvents which can be recovered by the process according to the invention are for instance dimethylacetamide, butyrolactone and ethylene carbonate.

If employing the above described extracting means, the separation between the two layers that form in the extracting process takes place very rapidly and is particularly sharp and there never occurs a danger of inversion of said layers. The invention will now be described by the following working examples without limitation. The percentages and parts are by weight, excepted where indicated to the contrary.

Example 1

50 ml. of a coagulating bath composed of 15% of dimethylformamide, of 50% of potassium formate and of 35% of water are shaken. The process is carried out at 20° C. The bath, which is limpid and homogeneous, has at that temperature a density of 1.318. It is shaken in a graduated separating funnel of 100 ml. capacity for one minute with 50 ml. of methyl formate (boiling point 32° C., density at 20° C.=0.975). In a few seconds there takes place separation of the mixture into two layers, but it is left at rest for about 15 minutes to carry said separation to completion. One gets a lower layer of 43 ml. and an upper layer of 57 ml. which contains 2.66% by volume of water. From data relative to that extraction it is calculated that 5.7 ml. of dimethylformamide have been extracted against 10.4 ml. contained in the 50 ml. of starting coagulating bath. Hence if operating as here was done with a ratio 1:1 by volume of extracting solvent with respect to the coagulating bath, it is found that methyl formate extracts 5.7 cc. of the dimethylformamide, equivalent to 54.8 of the dimethylformamide contained in the starting bath.

Example 2

Operation is carried out with the same quantities by volume, the same bath and the same modalities of Example 1, but employing ethyl formate (boiling point 55° C., density at 2° C.=0.936). There is got a lower layer of 42 ml. and an upper layer of 50 ml. which contains 1.45% by volume of water. There were extracted 6.35 ml. of dimethylformamide and, therefore, 61% of the dimethylformamide contained in the starting bath.

Example 3

Operation is carried out with the same bath, the same quantities by volume and the same modalities of Example 1, but n-propyl formate is employed (boiling point 81° C., density at 20° C.=0.891). One gets a lower layer of 42 ml. and an upper layer of 55 ml. which contains about 1.1% by volume of water. There were extracted 7.34 ml. of the dimethylformamide equivalent to 70.6% of the dimethylformamide contained in the starting bath.

Example 4

Operation is carried out with the same bath, the same quantities by volume and the same modalities of Example 1, but employing methyl acetate (boiling point 57° C., density at 20° C.=0.939). There are formed a lower layer of 42 ml. and an upper layer of 58 ml. which contains about 2.3% by volume of water. There were extracted about 6.67 ml. of dimethylformamide, equivalent to 64.1% of the dimethylformamide contained in the starting bath.

Example 5

Operation is carried out with the same bath, the same quantities by volume and the same modalities of Example 1, but employing ethyl acetate (boiling point 77° C., density at 2° C.=0.899). There are formed a lower layer of 41 ml. and an upper layer of 59 ml. containing about 1.7% by volume of water. There were extracted 8 ml. of dimethylformamide, equivalent to 77% of the dimethylformamide contained in the starting bath.

Example 6

Operation is carried out with the same bath, the same quantities by volume and the same modalities of Example 1, but employing amyl acetate (boiling point 142° C., density at 20° C.=0.970). There are formed a lower layer of 43 ml. and an upper layer of 57 ml. containing about 0.85% by volume of water. There were extracted 7 ml. of dimethylformamide, equivalent to 67.3% of the dimethylformamide contained in the starting bath.

Example 7

Operation is carried out with the same bath, the same quantities by volume and the same modalities of Example 1, but employing a mixture of 1 part by volume of methylene chloride and one part by volume of ethyl formate (density at 20° C.=1.1280). A lower layer of 41 ml. and upper layer of 59 ml. are formed which contains 0.8% by volume of water. There were extracted 8.5 ml. of dimethylformamide, equivalent to 81.6% of the dimethylformamide contained in the starting bath.

However the invention is not limited to the working examples described, but includes all and any variations that may be carried out by the skilled in the art.

We claim:

A process for recovering dimethylformamide from coagulating baths and stretching baths used in the wet-spinning of acrylonitrile polymers, containing from 30 to 75% by weight of potassium formate, comprising extracting the dimethylformamide with an extracting means consisting of a mixture of approximately equal amounts by weight of methylene chloride and a second component chosen from the group consisting of methyl, ethyl, isopropyl and n-propyl formates and methyl, ethyl, isopropyl, n-propyl and amyl acetates.

References Cited in the file of this patent

UNITED STATES PATENTS 2,649,481   Caldwell _____ Aug. 18, 1953

FOREIGN PATENTS 715,839   Great Britain _____ Sept. 22, 1954